United States Patent
Masuyama

(10) Patent No.: US 7,554,585 B2
(45) Date of Patent: Jun. 30, 2009

(54) IMAGE SENSING APPARATUS APPLIED TO INTERVAL PHOTOGRAPHY AND DARK NOISE SUPPRESSION PROCESSING METHOD THEREFOR

(75) Inventor: Hideyuki Masuyama, Machida (JP)

(73) Assignee: Olympus Corporation, Tokyo (JP)

( * ) Notice: Subject to any disclaimer, the term of this patent is extended or adjusted under 35 U.S.C. 154(b) by 845 days.

(21) Appl. No.: 10/990,212

(22) Filed: Nov. 16, 2004

(65) Prior Publication Data
US 2005/0110895 A1 May 26, 2005

(30) Foreign Application Priority Data
Nov. 20, 2003 (JP) ............... 2003-391099

(51) Int. Cl.
*H04N 9/64* (2006.01)
(52) U.S. Cl. .................. 348/243; 348/241; 348/248; 348/251; 358/461
(58) Field of Classification Search ........... 348/243, 348/229.1, 193, 241, 362, 351, 248; 358/461
See application file for complete search history.

(56) References Cited

U.S. PATENT DOCUMENTS

| 5,719,625 | A | | 2/1998 | Tani |
| 5,737,016 | A | * | 4/1998 | Ohzu et al. ........... 348/241 |
| 5,812,703 | A | * | 9/1998 | Juen et al. ............ 382/274 |
| 6,747,696 | B1 | | 6/2004 | Nakata et al. |
| 7,050,098 | B2 | * | 5/2006 | Shirakawa et al. ..... 348/245 |
| 2002/0012053 | A1 | * | 1/2002 | Yoshida .............. 348/243 |
| 2004/0196393 | A1 | | 10/2004 | Nakata et al. |

FOREIGN PATENT DOCUMENTS

| JP | 6-54262 A | 2/1994 |
| JP | 2000-125205 A | 4/2000 |
| JP | 2000-209487 A | 7/2000 |
| JP | 2000-217030 A | 8/2000 |
| JP | 2000-350091 | 12/2000 |

OTHER PUBLICATIONS

Japanese Office Action dated Apr. 21, 2009 and English translation thereof issued in a counterpart Japanese Application No. 2003-391099.

* cited by examiner

*Primary Examiner*—David L Ometz
*Assistant Examiner*—Usman Khan
(74) *Attorney, Agent, or Firm*—Frishauf, Holtz, Goodman & Chick, P.C.

(57) ABSTRACT

An image sensing apparatus has an image sensing element for photoelectric conversion, a shutter for selectively creating a light-shielded state and non-light-shielded state for the image sensing element, a bright signal storage unit for storing a bright signal output from the image sensing element in the non-light-shielded state, a dark signal storage unit for storing a dark signal output from the image sensing element in the light-shielded state, an operation unit for subtracting the dark signal from the bright signal to obtain a signal with suppressed dark noise, and a control unit for controlling read of bright and dark signals from the image sensing element in accordance with the relationship between the exposure time of the image sensing element and the photographing time interval.

12 Claims, 11 Drawing Sheets

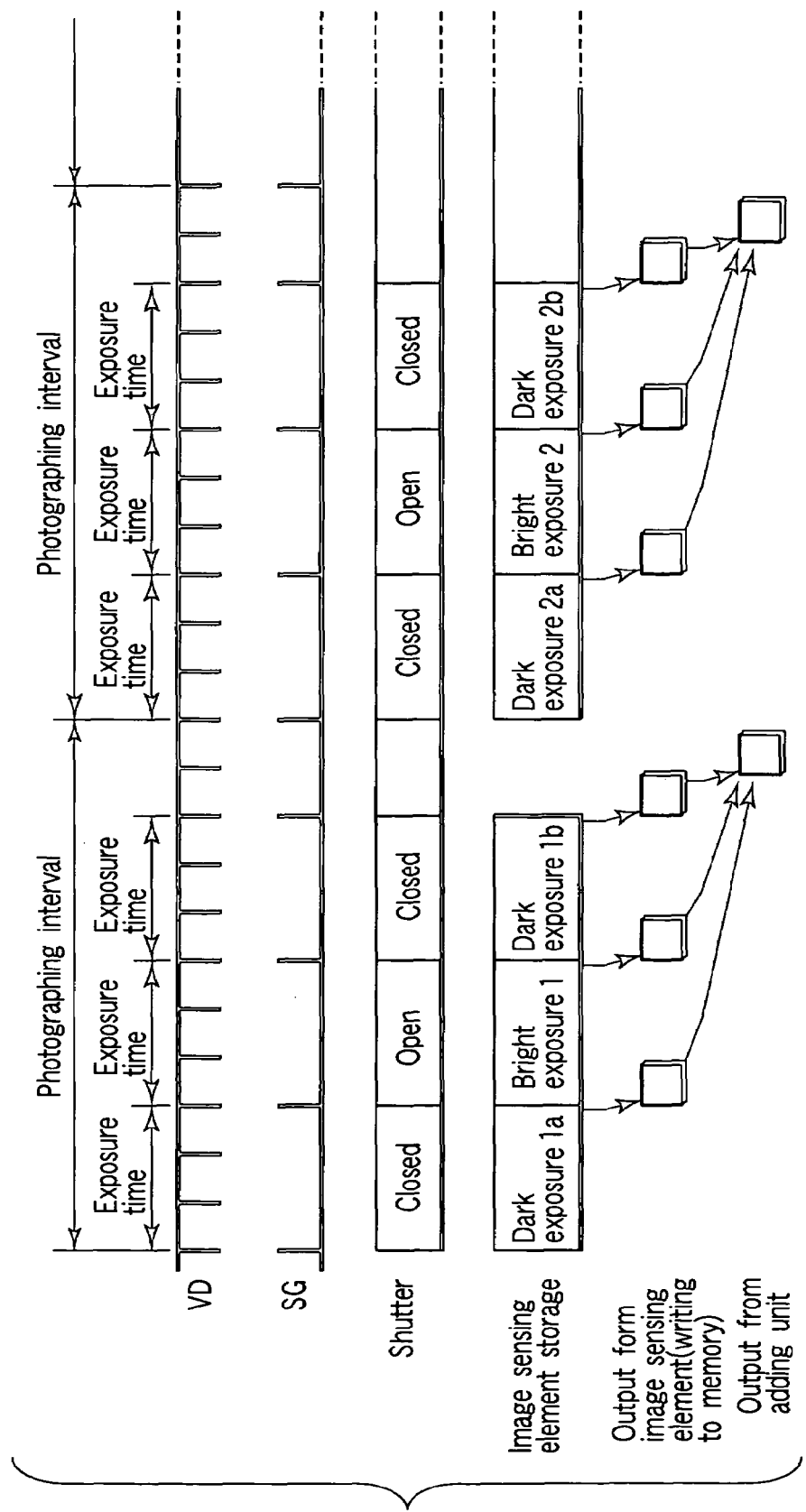
F I G. 10

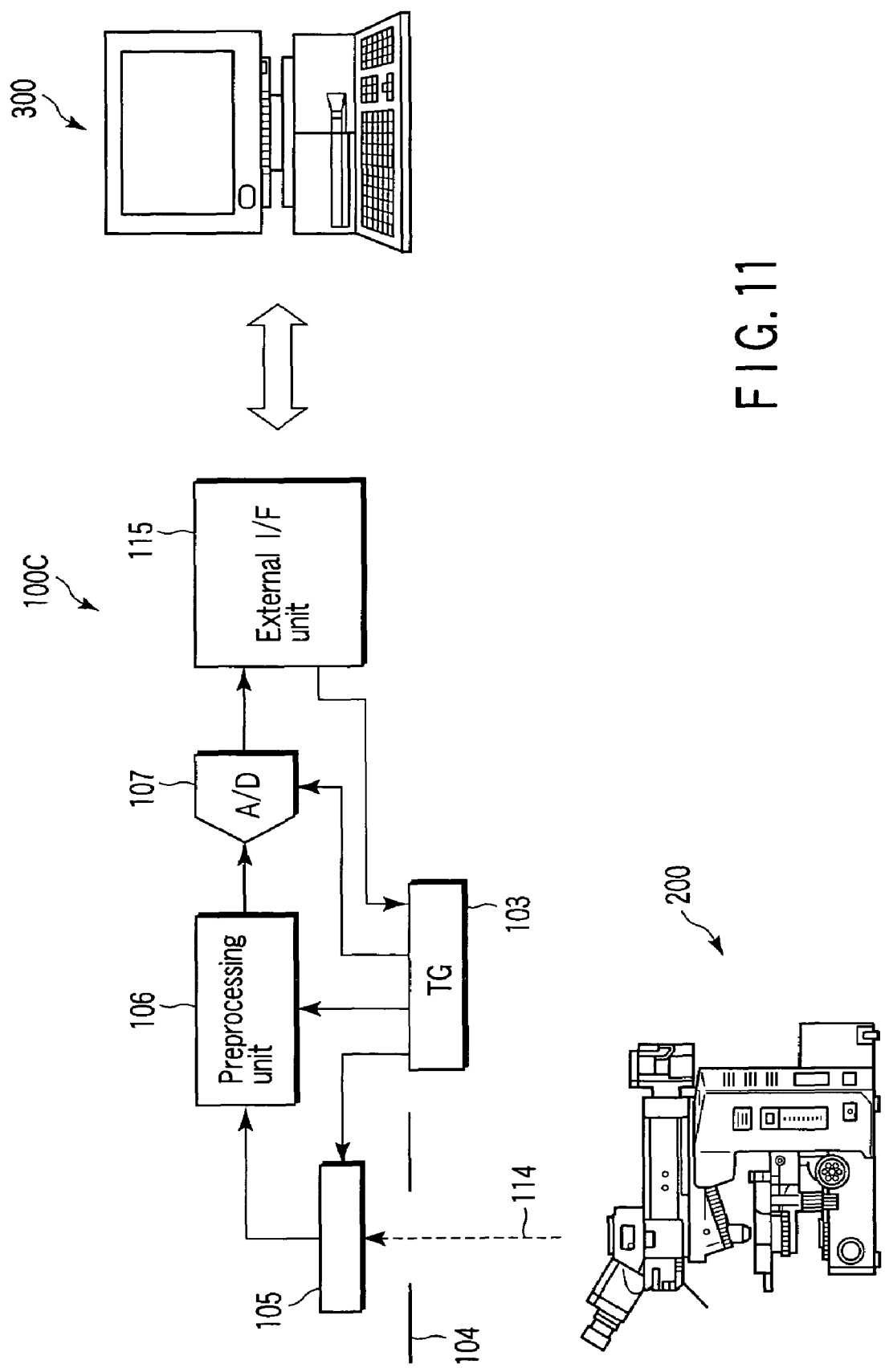
F I G. 11

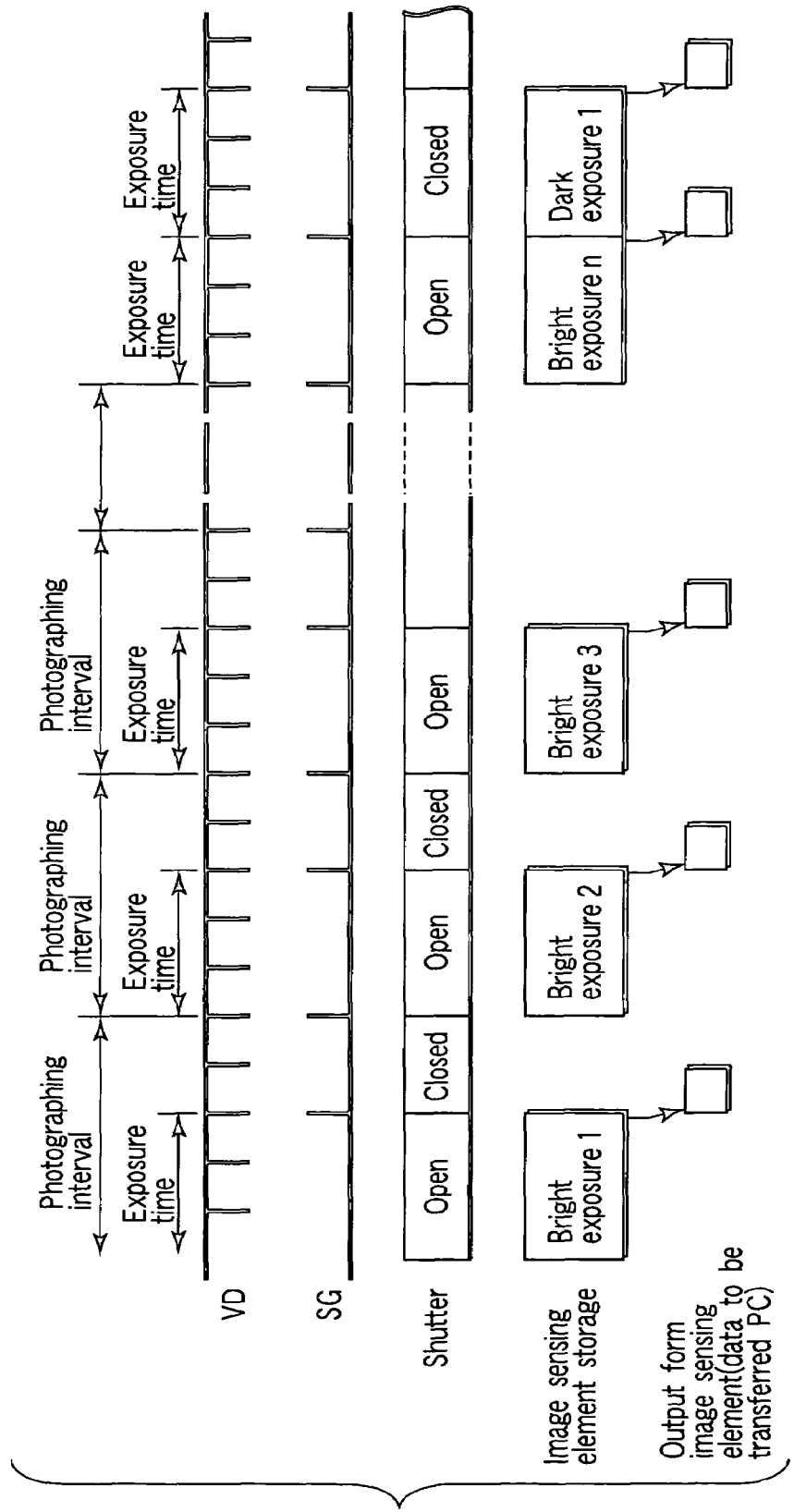
F I G. 13

IMAGE SENSING APPARATUS APPLIED TO INTERVAL PHOTOGRAPHY AND DARK NOISE SUPPRESSION PROCESSING METHOD THEREFOR

CROSS-REFERENCE TO RELATED APPLICATIONS

This application is based upon and claims the benefit of priority from prior Japanese Patent Application No. 2003-391099, filed Nov. 20, 2003, the entire contents of which are incorporated herein by reference.

BACKGROUND OF THE INVENTION

1. Field of the Invention

The present invention relates to an image sensing apparatus applied to interval photography which repeatedly performs photography (obtains still images) at predetermined time intervals.

2. Description of the Related Art

In microscopy, there is available a method of observing a change in sample over time while performing interval photography at predetermined photographing intervals using an image sensing apparatus, i.e., an observation method called time-lapse photography. This observation often uses fluorescence microscopy. Since light emitted from a sample is too weak in photographing the sample by a fluorescence microscope, the exposure time for an image sensing apparatus needs to be prolonged.

In an image sensing element such as a CCD or the like which is conventionally used in an image sensing apparatus, a current called a dark current may be generated even when the image sensing element is not receiving light. This dark current exerts a greater influence as the storage time of optical signal charges in the image sensing element becomes longer. Also, the dark current has high temperature dependence. As for the temperature dependence, when the temperature increases by about 8 to 10° C., the value for the dark current roughly doubles.

If an image sensing apparatus performs photography with a longer exposure time, dark noise may occur in an image in fixed patterns because of a dark current.

As a general method of temporarily reducing dark noise, there is available the following method.

An object is first photographed normally using a light-shielding shutter in an open state. Then, the light-shielding shutter is closed, and an image sensing element is set in a light-shielded state. A light-shielded image is photographed with the same exposure time as that for the normal object photography. The light-shielded image is subtracted from the normally photographed image, thereby obtaining an image with suppressed dark noise.

BRIEF SUMMARY OF THE INVENTION

An aspect of the present invention is directed to an image sensing apparatus applied to interval photography, in which photography is repeatedly performed at predetermined time intervals. The image sensing apparatus according to the present invention has an image sensing element for photoelectric conversion, a shutter for selectively creating a light-shielded state and non-light-shielded state for the image sensing element, a bright signal storage unit for storing a bright signal output from the image sensing element in the non-light-shielded state, a dark signal storage unit for storing a dark signal output from the image sensing element in the light-shielded state, an operation unit for subtracting the dark signal from the bright signal to obtain a signal with suppressed dark noise, and a control unit for controlling read of the bright signal and dark signal from the image sensing element in accordance with a relationship between an exposure time of the image sensing element and a photographing time interval.

Another aspect of the present invention is directed to a dark noise suppression processing method in an image sensing apparatus applied to interval photography, in which photography is repeatedly performed at predetermined time intervals. The dark noise suppression processing method according to the present invention has steps of controlling read of a signal from an image sensing element in accordance with a relationship between an exposure time of the image sensing element and a photographing time interval, and subtracting a dark signal output from the image sensing element in a light-shielded state from a bright signal output from the image sensing element in a non-light-shielded state to obtain a signal with suppressed dark noise.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention and, together with the general description given above and the detailed description of the embodiments given below, serve to explain the principles of the invention.

FIG. 10 shows the timing chart of the dark noise suppression process C shown in FIG. 9;

FIG. 11 schematically shows the arrangement of an image sensing apparatus according to the third embodiment of the present invention;

FIG. 13 shows the timing chart of the dark noise suppression process B shown in FIG. 12.

DETAILED DESCRIPTION OF THE INVENTION

Figure 1:
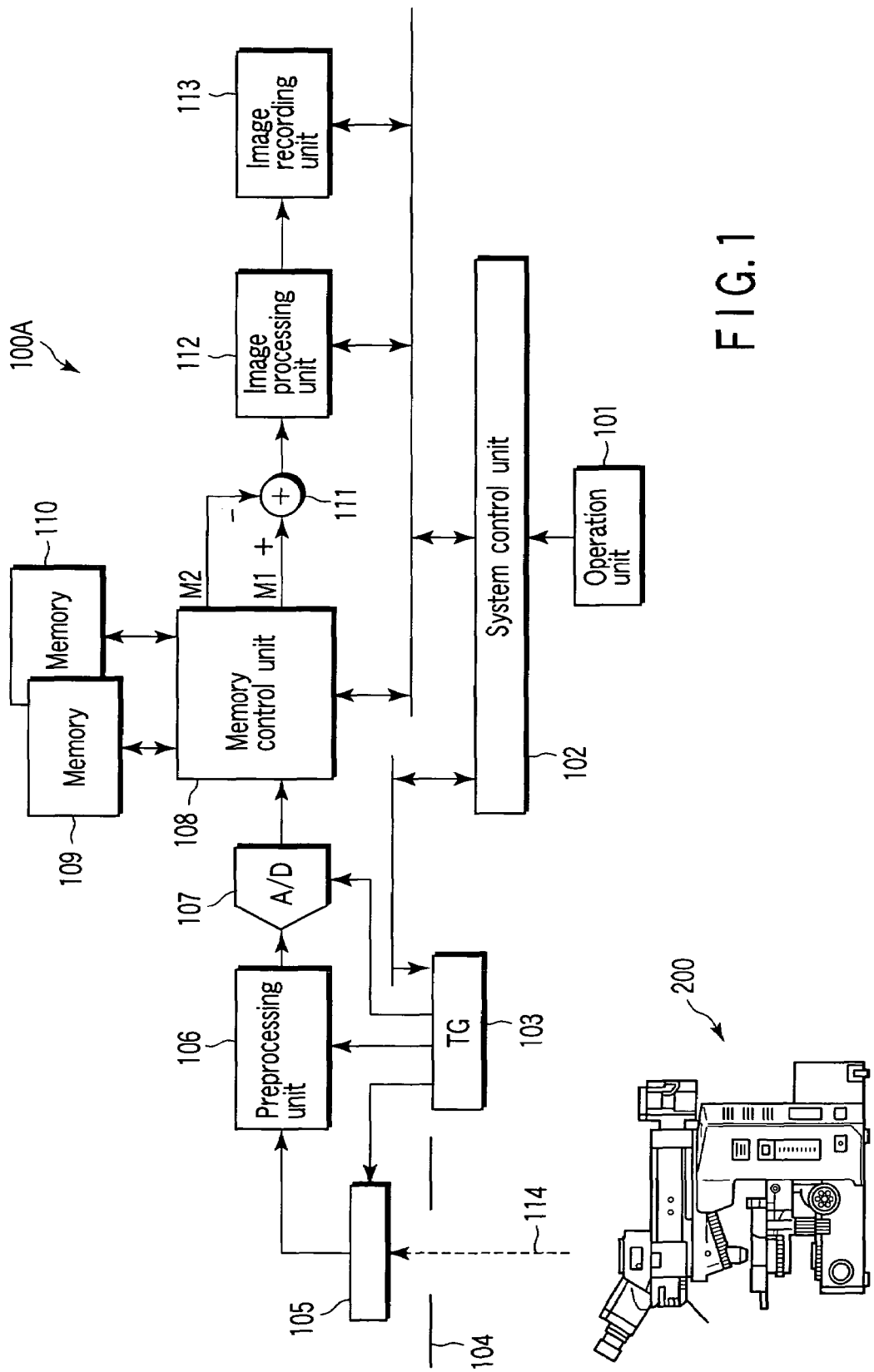
FIG. 1 schematically shows the arrangement of an image sensing apparatus according to the first embodiment of the present invention.

Embodiments of the present invention will be described with reference to the views of the drawing.

First Embodiment

FIG. 1 schematically shows the arrangement of an image sensing apparatus according to the first embodiment of the present invention.

An image sensing apparatus 100A has an image sensing means or image sensing element 105 arranged on an optical path 114 of an observation image obtained from a microscope 200, an exposure means or shutter 104 for switching between projection of the observation image onto the image sensing element 105 and shielding the image sensing element 105 from light, a preprocessing unit 106, which converts an output from the image sensing element 105 into an image signal, an A/D conversion unit 107, which converts an output from the preprocessing unit 106 into a digital signal, and a timing generator (TG) 103, which outputs timing pulses for driving the image sensing element 105, preprocessing unit 106, and A/D conversion unit 107.

The shutter 104 selectively creates a light-shielded state and non-light-shielded state for the image sensing element 105. The image sensing element 105 converts light on its image sensing surface into an electrical signal and outputs the signal (photo-electrically converts and outputs the signal). In the non-light-shielded state in which the shutter 104 is open, an observation image obtained from the microscope 200 is projected onto the image sensing element 105, which outputs a bright signal corresponding to the observation image. On the other hand, in the light-shielded state in which the shutter 104 is kept closed, the image sensing element 105 outputs a dark signal corresponding to noise.

The image sensing apparatus 100A further has a memory 109 serving as a bright signal storage means or bright signal storage unit for storing a bright signal M1, a memory 110 serving as a dark signal storage means or dark signal storage unit for storing a dark signal M2, a memory control unit 108, which controls write of a signal to the memory 109 and read of a signal from the memory 110, and an adding unit 111 serving as an operation means or operation unit for subtracting the dark signal M2 read out from the memory 110 from the bright signal M1 read out from the memory 109.

The adding unit 111 adds M1 and −M2 to subtract the dark signal M2 from the bright signal M1.

The image sensing apparatus 100A further has an image processing unit 112, which performs gray level conversion, edge enhancement, and the like for an output from the adding unit 111, an image recording unit 113, which records an image output from the image processing unit 112, an operation unit 101 for inputting an instruction from the user, and a system control unit 102 serving as a control means or control unit for controlling the memory control unit 108, image processing unit 112, image recording unit 113, and timing generator 103.

The operation unit 101 comprises interfaces such as a keyboard, mouse, and monitor, but the present invention is not limited to these interfaces.

Figure 2:
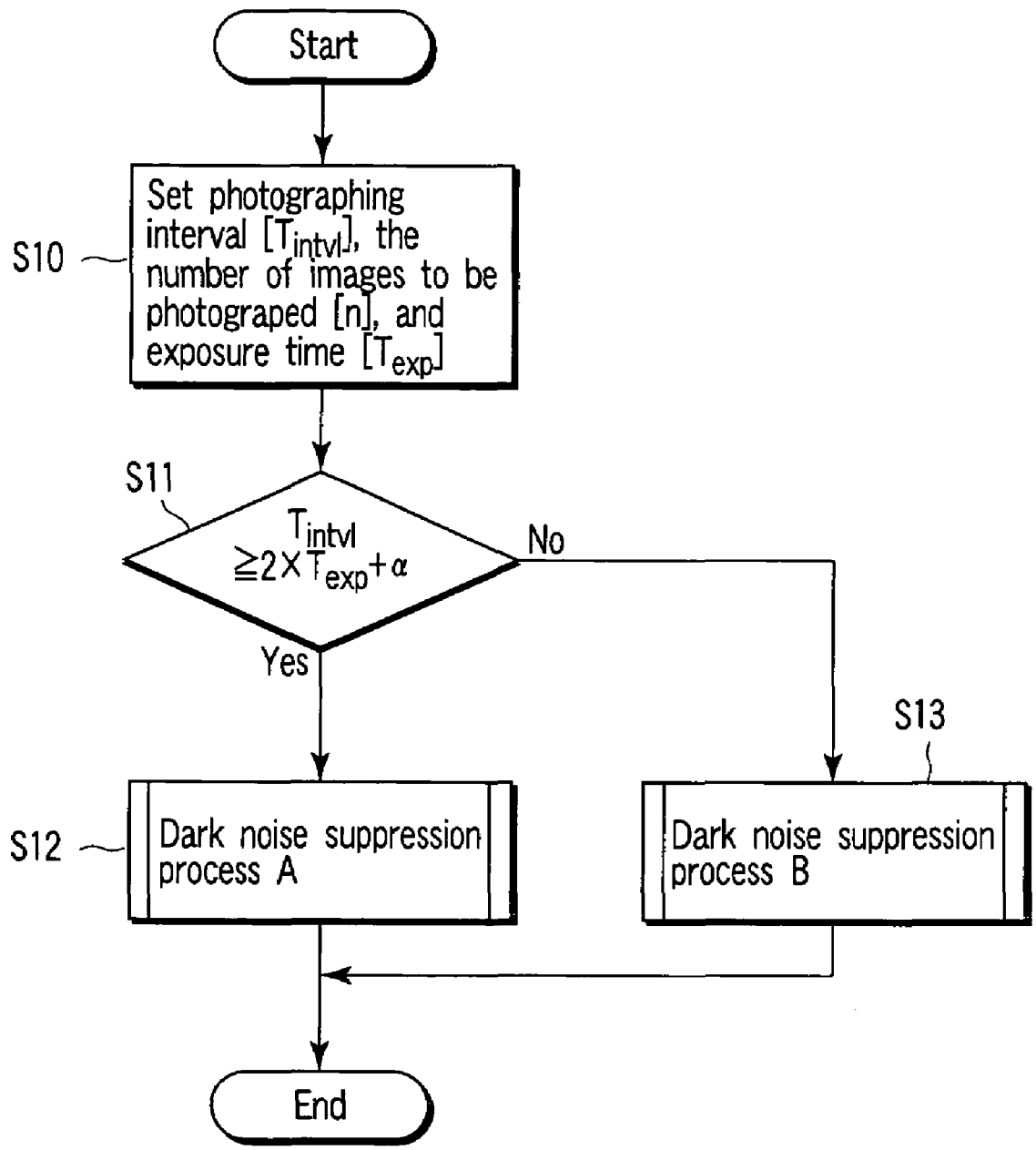
FIG. 2 shows the flow of the operation of the image sensing apparatus shown in FIG. 1.

The operation of the image sensing apparatus 100A will be described with reference to FIG. 2. FIG. 2 shows the flow of the operation of the image sensing apparatus 100A.

In S10, an operator designates the number of images to be photographed (n), a photographing interval ($T_{intvl}$), and an exposure time in photography ($T_{exp}$) in interval photography through the operation unit 101 and sets these parameters in the system control unit 102. The exposure time in photography may be calculated by automatic exposure.

In S11, the relationship between the photographing interval and the exposure time is determined. More specifically, it is determined whether the photo-graphing interval ($T_{intvl}$) and the exposure time ($T_{exp}$) satisfy $T_{intvl} \geq 2 \times T_{exp} + \alpha$. This determination is made by the system control unit 102. Whether bright photography and dark photography can be performed upon a photographing operation is determined by comparing the photographing interval with twice the exposure time. $\alpha$ basically represents a time margin for photo-graphing operation, shutter opening/closing operation, or both and has a numerical value of 0 or more. $\alpha$ may include a time margin for operation other than photographing operation and shutter opening/closing operation.

If the conditional expression in S11 is satisfied, a dark noise suppression process A is performed in S12; otherwise, a dark noise suppression process B is performed in S13.

Figure 3:
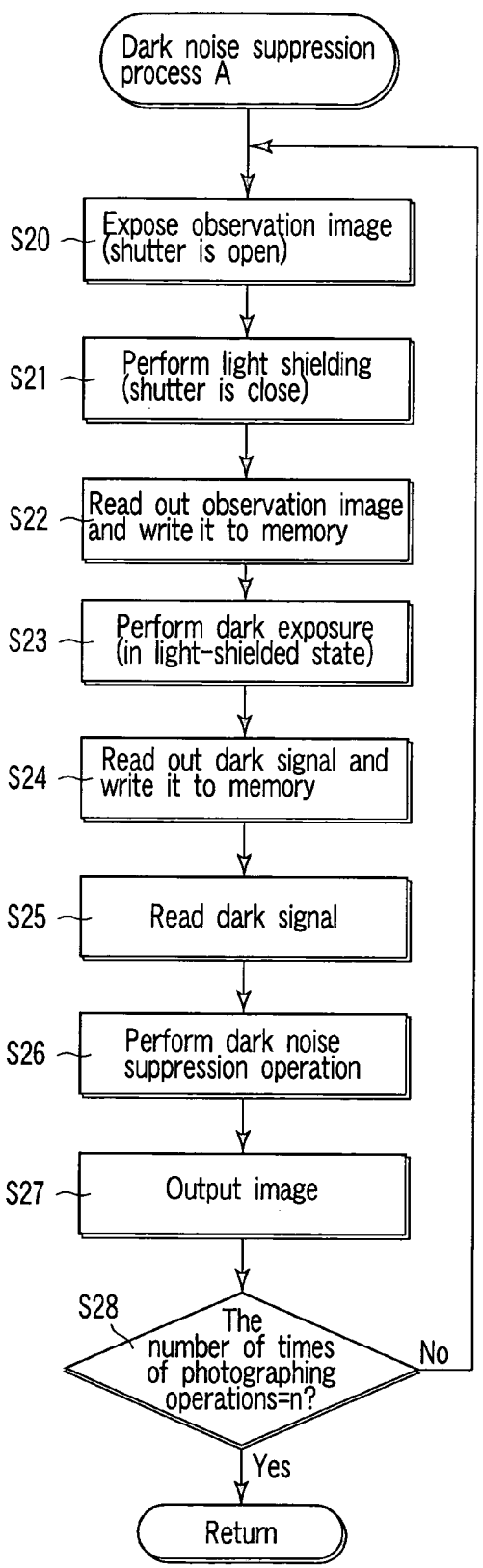
FIG. 3 shows the flow of a dark noise suppression process A if a conditional expression in S11 of FIG. 2 is satisfied.
Figure 4:
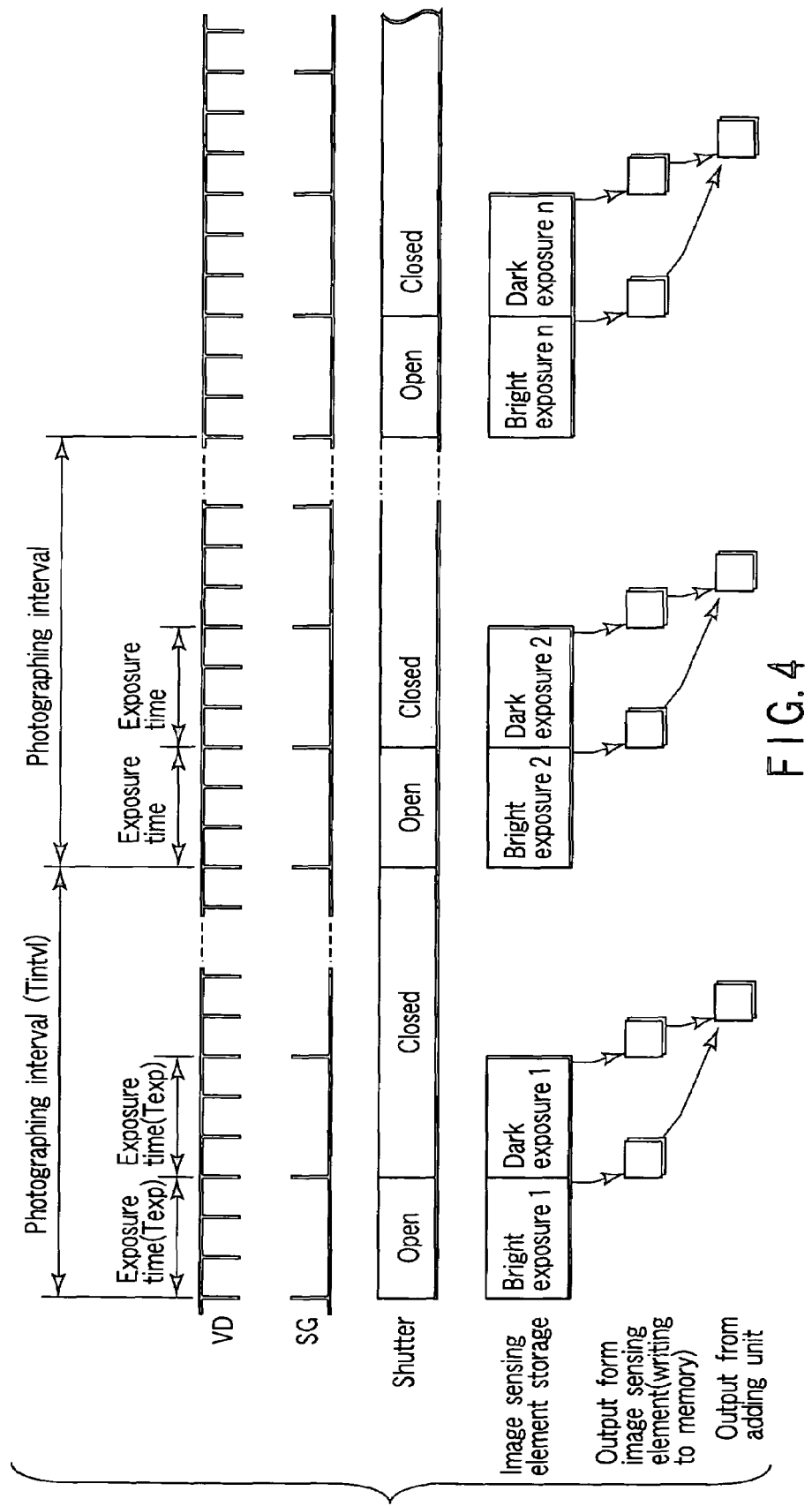
FIG. 4 shows the timing chart of the dark noise suppression process A shown in FIG. 3.

The dark noise suppression process A when the conditional expression in S11 is satisfied will be described below. FIG. 3 shows the flow of the dark noise suppression process A in S12. FIG. 4 shows the timing chart of the dark noise suppression process A in S12.

In S20, the system control unit 102 sets the exposure time ($T_{exp}$) in the TG 103, and a driving unit (not shown) opens the shutter 104. The TG 103 outputs a drive pulse in accordance with the exposure time to the image sensing element 105. With this pulse, the image sensing element 105 exposes an observation image at the timing of bright exposure 1 in FIG. 4.

In S21, after a lapse of the predetermined exposure time, the system control unit 102 closes the shutter 104.

In S22, upon reception of an SG pulse in FIG. 4, charges stored in the image sensing element 105 are read out and are converted into a video signal by the preprocessing unit 106. An output from the preprocessing unit 106 is converted into a digital signal by the A/D conversion unit 107 and is written in the memory 109 as a bright signal through the memory control unit 108.

In S23, the image sensing element 105 reads out the bright signal and performs dark exposure for the predetermined exposure time at the timing of dark exposure 1 in FIG. 4.

In S24, after a lapse of the predetermined exposure time, a dark signal is read out from the image sensing element 105 upon reception of an SG pulse in FIG. 4. An output from the image sensing element 105 is converted into a video signal by the preprocessing unit 106, similarly to a bright signal. An output from the preprocessing unit 106 is converted into a digital signal by the A/D conversion unit 107 and is written in the memory 110 as a dark signal through the memory control unit 108.

In S25, after the write of the dark signal to the memory 110 has ended, the bright signal in the memory 109 and the dark signal in the memory 110 are simultaneously read out through the memory control unit 108. The bright signal M1 read out from the memory 109 is input to the + input side of the adding unit 111 while the dark signal M2 read out from the memory 110 is input to the − input side of the adding unit 111.

In S26, the adding unit 111 subtracts the dark signal from the bright signal to output a signal with suppressed dark noise.

In S27, an output from the adding unit 111 is input to the image processing unit 112 and undergoes image processing such as gray level correction, edge enhancement, and the like.

After that, the image processing result is recorded in the image recording unit 113 as an image file, and photographing operation for the first image ends.

In S28, after the photographing operation for the first image ends, it is determined whether the number of times of photographing operations has been reached. If Yes in S28, photographing operation ends at this time. If No in S28, the flow shifts to photographing operation for the second image (S20 to S27) at the timing of bright exposure 2 in FIG. 4 when the predetermined photographing time interval has lapsed.

The photographing operation from S20 to S27 is repeated until the number of times of photographing operations is reached.

Figure 5:
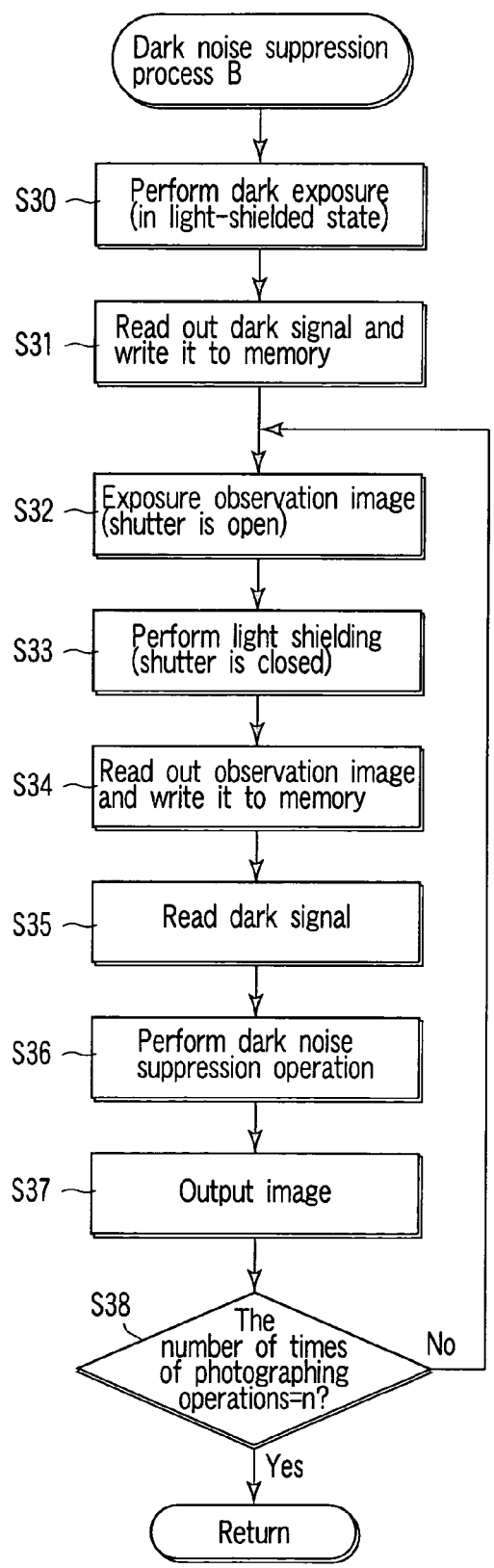
FIG. 5 shows the flow of a dark noise suppression process B if the conditional expression in S11 of FIG. 2 is not satisfied.
Figure 6:
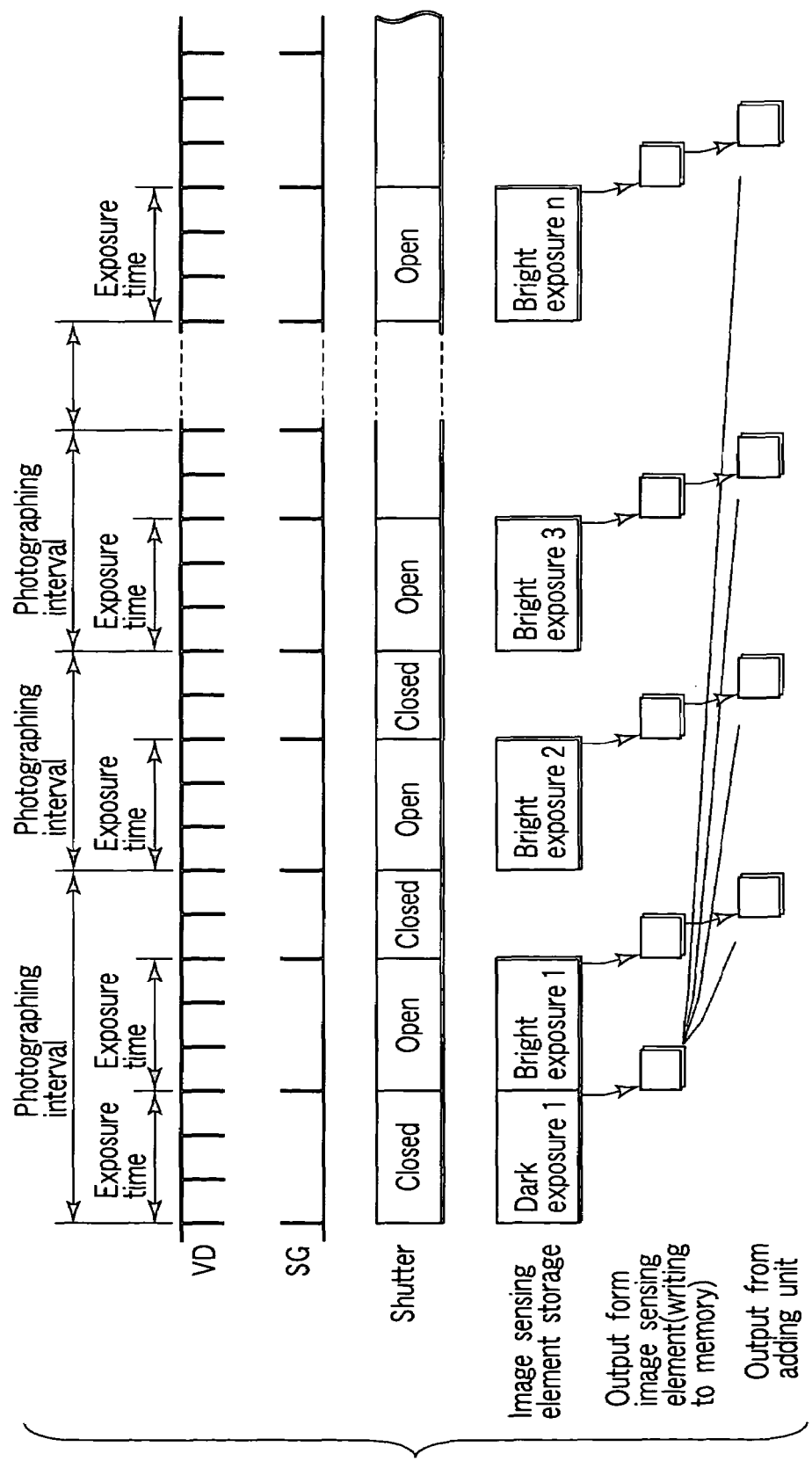
FIG. 6 shows the timing chart of the dark noise suppression process B shown in FIG. 5.

The dark noise suppression process B when the conditional expression in S11 is not satisfied will be described below. FIG. 5 shows the flow of the dark noise suppression process B in S13. FIG. 6 shows the timing chart of the dark noise suppression process B in S13.

In S30, the system control unit 102 sets the exposure time ($T_{exp}$) in the TG 103, and the driving unit (not shown) closes the shutter 104. The TG 103 outputs a drive pulse in accordance with the exposure time to the image sensing element 105. With this pulse, the image sensing element 105 performs exposure in the light-shielded state at the timing of dark exposure 1 in FIG. 6.

In S31, after a lapse of the predetermined exposure time, a dark signal is read out from the image sensing element 105 upon reception of an SG pulse in FIG. 6. The dark signal is converted into a video signal by the preprocessing unit 106. An output from the preprocessing unit 106 is converted into a digital signal by the A/D conversion unit 107 and is written in the memory 110 as a dark signal through the memory control unit 108.

In S32, after the write of the dark signal has ended, the system control unit 102 opens the shutter 104. The image sensing element 105 exposes an observation image at the timing of bright exposure 1 in FIG. 6.

In S33, after a lapse of the predetermined exposure time, the system control unit 102 closes the shutter 104.

In S34, upon reception of an SG pulse in FIG. 6, charges stored in the image sensing element 105 are read out and are converted into a video signal by the preprocessing unit 106. An output from the preprocessing unit 106 is converted into a digital signal by the A/D conversion unit 107 and is written in the memory 109 as a bright signal through the memory control unit 108.

In S35, after the write of the bright signal to the memory 109 has ended, the bright signal in the memory 109 and the dark signal in the memory 110 are simultaneously read out through the memory control unit 108. The bright signal M1 read out from the memory 109 is input to the +input side of the adding unit 111 while the dark signal M2 read out from the memory 110 is input to the –input side of the adding unit 111.

In S36, the adding unit 111 subtracts the dark signal from the bright signal to output a signal with suppressed dark noise.

In S37, an output from the adding unit 111 is input to the image processing unit 112 and undergoes image processing such as gray level correction, edge enhancement, and the like. After that, the image processing result is recorded in the image recording unit 113 as an image file, and photographing operation for the first image ends.

In S38, after the photographing operation for the first image ends, it is determined whether the number of times of photographing operations has been reached. If Yes in S38, photographing operation ends at this time. If No in S38, the flow shifts to photographing operation for the second image (S32 to S37) at the timing of bright exposure 2 in FIG. 6 when the predetermined photographing time interval has lapsed.

The photographing operation from S32 to S37 is repeated until the number of times of photographing operations is reached. Dark exposure is skipped in photographing operations for the second and subsequent images. For this reason, a dark signal written in the memory 110 at the timing of dark exposure 1 before the photographing operation for the first image is read out in S36.

As can be seen from the above description, the image sensing apparatus 100A according to this embodiment can record a high-quality image with suppressed dark noise while ensuring predetermined photographing intervals in interval photography.

The image sensing apparatus 100A includes the image processing unit 112, which performs image processing such as gray level correction, edge enhancement, and the like and the image recording unit 113, which records an output from the image processing unit 112 as an image file. However, these units may be provided outside the image sensing apparatus 100A. In this case, in an arrangement from which both the image processing unit 112 and the image recording unit 113 are removed, a signal with suppressed dark noise is externally output in image output in S27 and S37. On the other hand, in an arrangement from which only the image recording unit 113 is removed, a signal with suppressed dark noise, having undergone image processing such as gray level correction, edge enhancement, and the like, is externally output.

In this embodiment, the shutter is temporarily closed in S33 of the dark noise suppression process B. However, dark exposure is already performed in S30, and only bright photography is performed after that. For this reason, step S33 may be skipped, and steps S32 to S37 (except step S33) may repeatedly be performed while the shutter is open.

Second Embodiment

Figure 7:
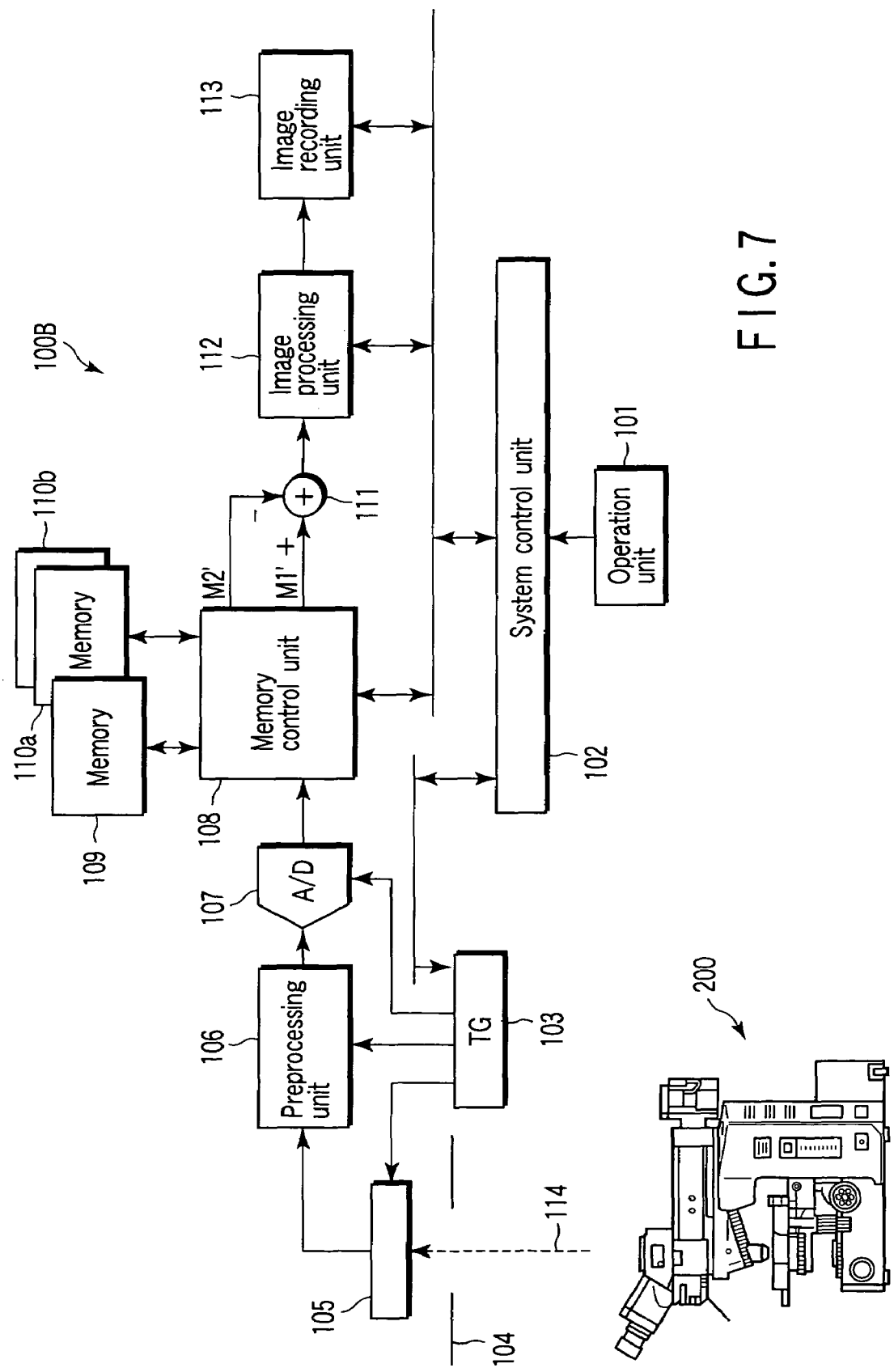
FIG. 7 schematically shows the arrangement of an image sensing apparatus according to the second embodiment of the present invention.

This embodiment is directed to a modification of the photographing operation of the image sensing apparatus according to the first embodiment. FIG. 7 schematically shows the arrangement of an image sensing apparatus according to the second embodiment of the present invention. The same reference numerals as in the second embodiment denote the same members as those in the first embodiment, and a detailed description thereof will be omitted.

An image sensing apparatus 100B according to this embodiment has, as dark signal storage means or dark signal storage units, a memory 110a for storing a dark signal M2a and a memory 110b for storing a dark signal M2b, instead of the memory 110 in the first embodiment. The remaining arrangement is identical to the arrangement of the image sensing apparatus 100A according to the first embodiment.

Figure 8:
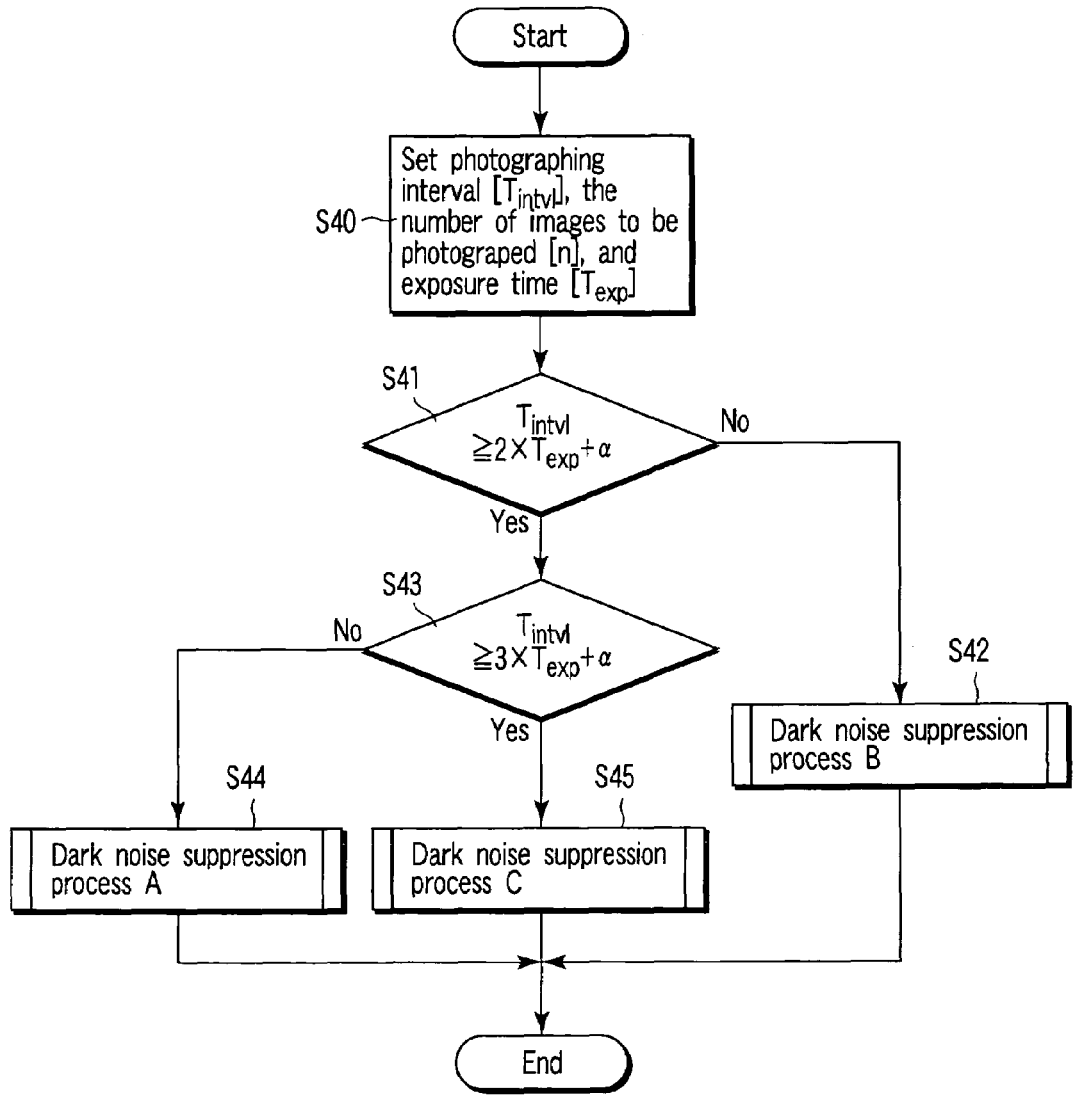
FIG. 8 shows the flow of the operation of the image sensing apparatus shown in FIG. 7.

The operation of the image sensing apparatus 100B will be described with reference to FIG. 8. FIG. 8 shows the flow of the operation of the image sensing apparatus 100B.

In S40, an operator designates the number of images to be photographed (n), a photographing interval ($T_{intvl}$), and an exposure time in photography ($T_{exp}$) in interval photography through an operation unit 101 and sets these parameters in a system control unit 102. The exposure time in photography may be calculated by automatic exposure.

In S41, the relationship between the photographing interval and the exposure time is determined. More specifically, it is determined whether the photo-graphing interval ($T_{intvl}$) and the exposure time ($T_{exp}$) satisfy $T_{intvl} \geq 2 \times T_{exp} + \alpha$. This determination is made by a system control unit 102. Whether bright photography and dark photography can be performed upon a photographing operation is determined by comparing the photographing interval with twice the exposure time. α basically represents a time margin for photographing operation, shutter opening/closing operation, or both and has a numerical value of 0 or more. α may include a time margin for operation other than photographing operation and shutter opening/closing operation.

If the conditional expression in S41 is not satisfied, a dark noise suppression process B is performed in S42; otherwise, the relationship between the photographing interval and the exposure time is further determined in S43.

In S43, it is determined whether the photographing interval ($T_{intvl}$) and the exposure time ($T_{exp}$) satisfy $T_{intvl} \geq 3 \times T_{exp} + \alpha$. This determination is made by the system control unit 102. Whether dark photography can be performed before and after bright photography upon a photographing operation is determined by comparing the photographing interval with three times the exposure time. α basically represents a time margin for photographing operation, shutter opening/closing operation, or both and has a numerical value of 0 or more. α may include a time margin for operation other than photographing operation and shutter opening/closing operation.

If the conditional expression in S43 is not satisfied, a dark noise suppression process A is performed in S44; otherwise, a dark noise suppression process C is performed in S45.

Referring to the flow in FIG. 8, the dark noise suppression process A in S44 is the same as that in S12 according to the first embodiment, and the dark noise suppression process B in S42 is the same as that in S13 according to the first embodiment. Accordingly, a description of these processes will be omitted. In the dark noise suppression process A in S44 and the dark noise suppression process B in S42, a dark signal M is stored in the memory 110a or memory 110b.

Figure 9:
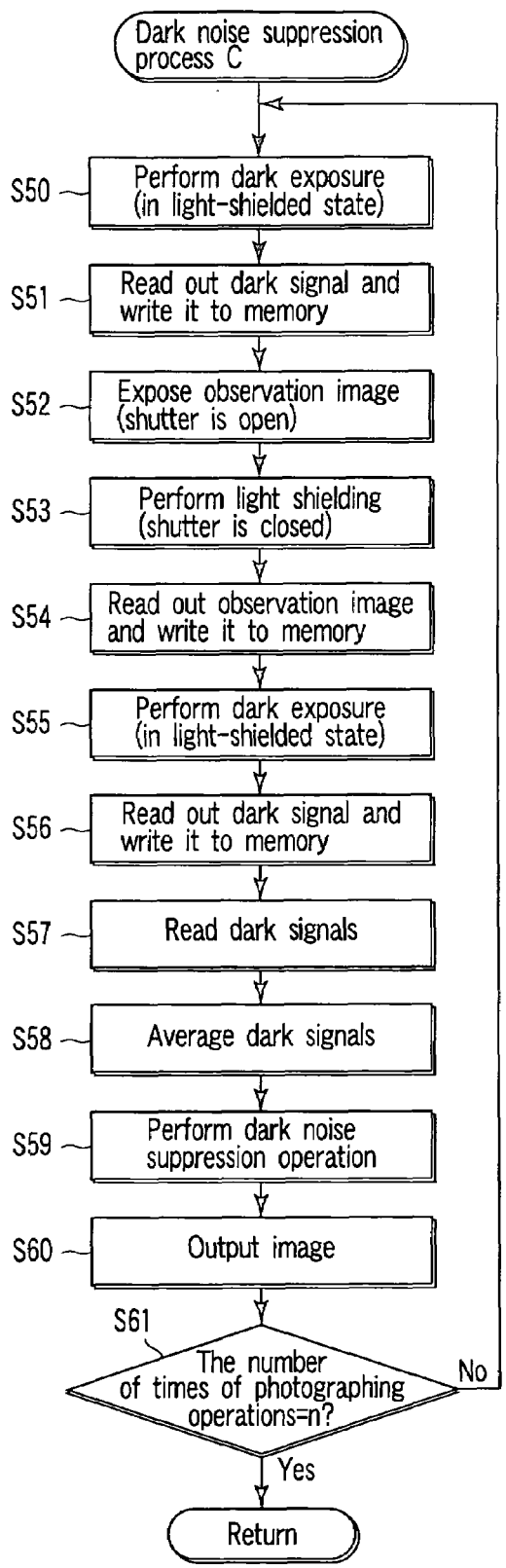
FIG. 9 shows the flow of a dark noise suppression process C if a conditional expression in S43 of FIG. 8 is satisfied.

The dark noise suppression process C when the conditional expression in S43 is satisfied will be described below. FIG. 9 shows the flow of the dark noise suppression process C. FIG. 10 shows the timing chart of the dark noise suppression process C in S45.

In S50, the system control unit 102 sets the exposure time ($T_{exp}$) in a TG 103, and a driving unit (not shown) closes a shutter 104. The TG 103 outputs a drive pulse in accordance with the exposure time to an image sensing element 105. With this pulse, the image sensing element 105 performs exposure in a light-shielded state at the timing of bright exposure 1 at the timing of dark exposure 1a in FIG. 10.

In S51, after a lapse of the predetermined exposure time, a dark signal is read out from the image sensing element 105 upon reception of an SG pulse in FIG. 10. The dark signal is converted into a video signal by a preprocessing unit 106. An output from the preprocessing unit 106 is converted into a digital signal by an A/D conversion unit 107 and is written in the memory 110a as a dark signal through a memory control unit 108.

In S52, after the write of the dark signal has ended, the system control unit 102 opens the shutter 104. The image sensing element 105 exposes an observation image at the timing of bright exposure 1 in FIG. 10.

In S53, after a lapse of the predetermined exposure time, the system control unit 102 closes the shutter 104.

In S54, upon reception of the SG pulse in FIG. 10, charges stored in the image sensing element 105 are read out and are converted into a video signal by the preprocessing unit 106. An output from the preprocessing unit 106 is converted into a digital signal by the A/D conversion unit 107 and is written in the memory 109 as a bright signal through the memory control unit 108.

In S55, the system control unit 102 closes the shutter 104 by a driving unit (not shown). The TG 103 outputs a drive pulse in accordance with the exposure time to the image sensing element 105. With this pulse, the image sensing element 105 performs exposure in the light-shielded state at the timing of dark exposure 1b in FIG. 10.

In S56, after a lapse of the predetermined exposure time, a dark signal is read out from the image sensing element 105 upon reception of an SG pulse in FIG. 10. The dark signal is converted into a video signal by the preprocessing unit 106. An output from the preprocessing unit 106 is converted into a digital signal by the A/D conversion unit 107 and is written in the memory 110b as a dark signal through the memory control unit 108.

In S57, after the write of the dark signal to the memory 110b has ended, the bright signal in the memory 109 and the dark signals in the memory 110a and memory 110b are simultaneously read out through the memory control unit 108. A bright signal M1 read out from the memory 109 is input to the +input side of an adding unit 111.

In S58, the memory control unit 108 calculates an average dark signal M2' from the dark signal M2a read out from the memory 110a and the dark signal M2b read from the memory 110b. The average dark signal M2' is input to the − input side of the adding unit 111.

In S59, the adding unit 111 subtracts the average dark signal M2' from the bright signal M1 to output a signal with suppressed dark noise.

In S60, an output from the adding unit 111 is input to an image processing unit 112 and undergoes image processing such as gray level correction, edge enhancement, and the like. After that, the image processing result is recorded in an image recording unit 113 as an image file, and photographing operation for the first image ends.

In S61, after the photographing operation for the first image ends, it is determined whether the number of times of photographing operations has been reached. If Yes in S61, photographing operation ends at this time. If No in S61, the flow shifts to photographing operation for the second image (S50 to S60) at the timing of dark exposure 2a in FIG. 10 when the predetermined photographing time interval has lapsed.

The photographing operation from S50 to S60 is repeated until the number of times of photographing operations is reached.

In this embodiment, two dark exposure operations are performed before and after a bright exposure operation if the photographing interval is three times or more the exposure time. More specifically, dark signals are obtained before and after a photographing operation. For this reason, a high-quality image with further suppressed random noise can be recorded, in addition to the advantages of the first embodiment.

In this embodiment as well, the image processing unit 112 and image recording unit 113 may be provided outside the image sensing apparatus 100B.

Although in this embodiment, two dark exposure operations are performed before and after each bright exposure operation, two dark photographing operations may consecutively be performed after each bright photographing operation.

Instead of two dark exposure operations in this embodiment, three or more dark exposure operations may be performed if the condition, $T_{intvl} \geq (n+1) \times T_{exp} + \alpha$ (where n is the number of times of dark exposure operation), is satisfied.

Third Embodiment

This embodiment is directed to a modification of the photographing operation of the image sensing apparatus according to the first embodiment. FIG. 11 schematically shows the arrangement of an image sensing apparatus according to the third embodiment of the present invention. The same reference numerals as in the third embodiment denote the same members as those in the first embodiment, and a detailed description thereof will be omitted.

An image sensing apparatus 100C according to this embodiment has an external I/F unit 115 for inputting/outputting signals and a computer 300 connected through the external I/F unit 115, instead of the memory 109, memory 110, memory control unit 108, adding unit 111, image processing unit 112, image recording unit 113, operation unit 101, and system control unit 102 in the first embodiment. The remaining arrangement is identical to the arrangement of the image sensing apparatus 100A according to the first embodiment.

In this embodiment, the computer 300 fulfills functions equivalent to those of the memory 109, memory 110, memory control unit 108, adding unit 111, image processing unit 112, image recording unit 113, operation unit 101, and system control unit 102 in the first embodiment.

The operation of the image sensing apparatus 100C is basically the same as that in the first embodiment. That is, the flow of the operation of the image sensing apparatus 100C is the same as that in FIG. 2.

In S10, an operator designates the number of images to be photographed (n), a photographing interval ($T_{intvl}$), and an exposure time in photography ($T_{exp}$) in interval photography through the computer 300. The exposure time in photography may be calculated by automatic exposure.

In S11, it is determined whether the photographing interval ($T_{intvl}$) and the exposure time ($T_{exp}$) satisfy $T_{intvl} \geq 2 \times T_{exp} + \alpha$.

If the conditional expression in S11 is satisfied, a dark noise suppression process A is performed in S12; otherwise, a dark noise suppression process B is performed in S13.

The dark noise suppression process A when the conditional expression in S11 is satisfied is performed in exactly the same manner as in the flow in FIG. 3. In this case, a memory for storing dark and bright signals is implemented by a memory within the computer 300. Dark noise suppression operation is performed by the computer 300 using software. An image recording unit is implemented by a recording medium such as a hard disk within the computer 300.

Figure 12:
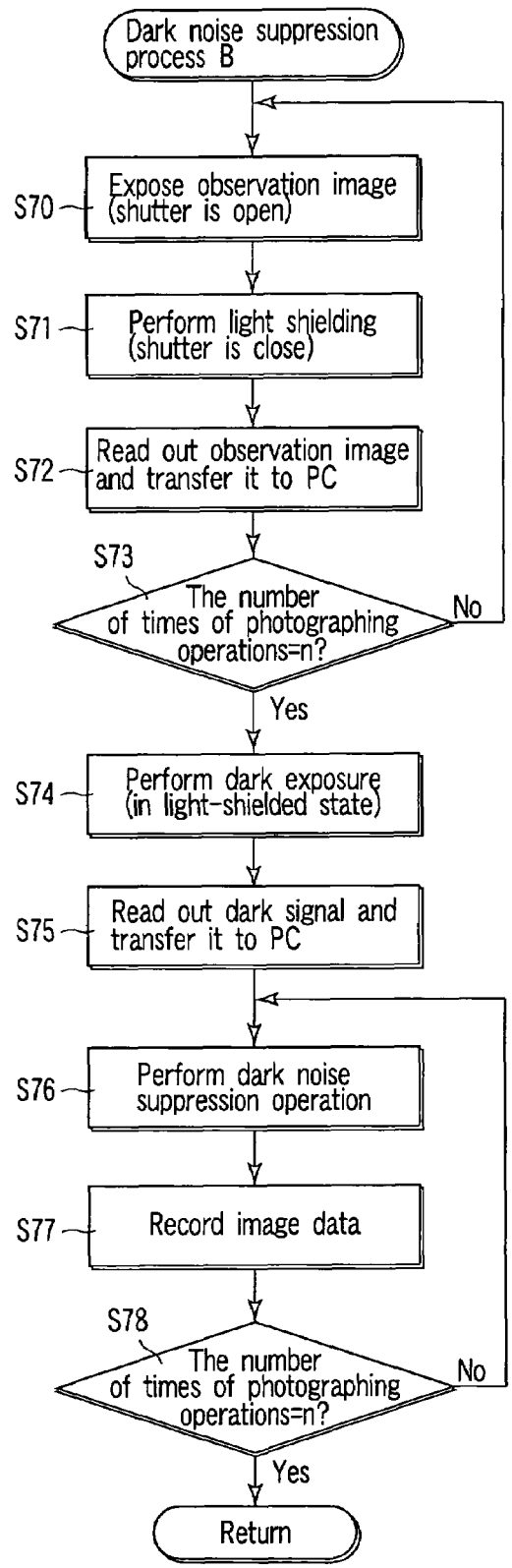
FIG. 12 shows the flow of the dark noise suppression process B if the conditional expression in S11 of FIG. 2 is not satisfied in the third embodiment.

The dark noise suppression process B when the conditional expression in S11 is not satisfied will be described below. FIG. 12 shows the flow of the dark noise suppression process B. FIG. 13 shows the timing chart of the dark noise suppression process B in this embodiment.

In S70, the computer 300 sends a signal to a TG 103 and shutter driving unit (not shown) through the external I/F unit 115. The computer 300 sets the exposure time ($T_{exp}$) in the TG 103, and the shutter driving unit (not shown) opens a shutter 104. The TG 103 outputs a drive pulse in accordance with the exposure time to an image sensing element 105. With this pulse, the image sensing element 105 exposes an observation image at the timing of bright exposure 1 in FIG. 13.

In S71, after a lapse of the predetermined exposure time, the computer 300 sends a signal to the shutter driving unit through the external I/F unit 115 and closes the shutter 104.

In S72, upon reception of an SG pulse in FIG. 13, charges stored in the image sensing element 105 are read out and are converted into a video signal by a preprocessing unit 106. An output from the preprocessing unit 106 is converted into a digital signal by an A/D conversion unit 107, is transferred to the computer 300 through the external I/F unit 115, and is written in the memory within the computer 300 as a bright signal.

In S73, after photographing operation for the first image ends, it is determined whether the number of times of photographing operations has been reached. If Yes in S73, the flow shifts to S74. If No in S73, the flow shifts to photographing operation for the second image (S70 to S72) at the timing of bright exposure 2 in FIG. 13 when the predetermined photographing time interval has lapsed.

The photographing operation from S70 to S72 is repeated until the number of times of photographing operations is reached.

In S74, after photographing operation for the last image, i.e., the nth image ends, the image sensing element 105 performs dark exposure for the predetermined exposure time at the timing of dark exposure 1 in FIG. 13.

In S75, after a lapse of the predetermined exposure time, a dark signal is read out from the image sensing element 105 upon reception of an SG pulse in FIG. 13. An output from the image sensing element 105 is converted into a video signal by the preprocessing unit 106, similarly to a bright signal. An output from the preprocessing unit 106 is converted into a digital signal by an A/D conversion unit 107, is transferred to the computer 300 through the external I/F unit 115, and is written in the memory within the computer 300 as a dark signal.

In S76, the dark signal and the bright signal for the first image are read out from the memory within the computer 300. The dark signal is subtracted from the bright signal, so that a signal with suppressed dark noise is generated.

In S77, the signal with suppressed dark noise undergoes image processing such as gray level correction, edge enhancement, and the like. After that, the image processing result is recorded on a recording medium such as a hard disk within the computer 300 as an image file.

In S78, after the photographing operation for the first image ends, it is determined whether the number of times of photographing operations has been reached. If Yes in S78, photographing operation ends at this time. If No in S78, the flow shifts to dark noise suppression (S76) and image recording (S77) for the second image.

The dark noise suppression operation (S76) and image recording operation (S77) are repeated until the number of times of photographing operations is reached.

As can be seen from the above description, the image sensing apparatus 100C according to this embodiment can record a high-quality image with suppressed dark noise while ensuring predetermined photographing intervals in interval photography.

In this embodiment, a dark signal is obtained after bright exposure n for the last (nth) image. However, a dark signal may be obtained before bright exposure 1 for the first image. Alternatively, dark signals may be obtained before bright exposure 1 for the first image and after bright exposure n for the last (nth) image, and dark noise suppression processing may be performed using the average of the dark signals. Alternatively, a dark signal that is obtained before bright exposure 1 for the first image may be used for dark noise suppression of bright signals for the first to (n/2) th images while a dark signal that is obtained after bright exposure n for the last (nth) image may be used for dark noise suppression of bright signals for the (n/2+1)th to nth images. If n is an odd number, an integer value obtained by dropping the fractional portion of n/2 is used instead of n/2. More specifically, the dark signal before the repetitive photography may be subtracted from each of the former half of bright signals while the dark signal after the repetitive photography may be subtracted from each of the latter half of the bright signals.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image sensing apparatus for interval photography, in which photography is repeatedly performed at predetermined time intervals, said image sensing apparatus comprising:
    an image sensing element which performs photoelectric conversion;
    a shutter which selectively creates a light-shielded state and non-light-shielded state for the image sensing element;
    a bright signal storage unit which stores a bright signal output from the image sensing element in the non-light-shielded state;
    a dark signal storage unit which stores a dark signal output from the image sensing element in the light-shielded state;
    an operation unit which subtracts the dark signal from the bright signal to obtain a signal with suppressed dark noise; and
    a control unit which controls reading the bright signal and dark signal from the image sensing element in accordance with a relationship between an exposure time of the image sensing element and a photographing time interval;
    wherein, if a photographing interval ($T_{intvl}$) and an exposure time ($T_{exp}$) of the image sensing element do not satisfy $T_{intvl} \geq 2 \times T_{exp} + \alpha$ (where $\alpha$ represents a time margin), the control unit reads out a dark signal before starting repetitive photography, the readout dark signal is stored in the dark signal storage unit, and the operation unit subtracts the dark signal stored in the dark signal storage unit from each of bright signals read out by repetitive reading.

2. An apparatus according to claim 1, wherein, if the photographing interval and the exposure time satisfy $T_{intvl} \geq 2 \times T_{exp} + \alpha$, the control unit reads out a bright signal and a dark signal during a repetitive photographing operation, the readout bright signal and dark signal are stored in the bright signal storage unit and dark signal storage unit, respectively, and the operation unit subtracts the dark signal stored in the dark signal storage unit from the bright signal stored in the bright signal storage unit.

3. An apparatus according to claim 2, wherein, if the photographing interval and the exposure time of the image sensing element satisfy $T_{intvl} \geq 3 \times T_{exp} + \alpha$, the control unit reads out a bright signal and also reads out dark signals before and after reading of the bright signal during a repetitive photographing operation, the readout bright signal and dark signals are stored in the bright signal storage unit and dark signal storage unit, respectively, and the operation unit subtracts an average of the two dark signals, which are read out before and after acquisition of the bright signal and then stored in the dark signal storage unit, from the bright signal stored in the bright signal storage unit.

4. A dark noise suppression processing method for interval photography, in which photography is repeatedly performed at predetermined time intervals, said method comprising:
    controlling reading of a signal from an image sensing element in accordance with a relationship between an exposure time of the image sensing element and a photographing time interval; and
    subtracting a dark signal output from the image sensing element in a light-shielded state from a bright signal output from the image sensing element in a non-light-shielded state to obtain a signal with suppressed dark noise;
    wherein, if a photographing interval ($T_{intvl}$) and an exposure time ($T_{exp}$) of the image sensing element do not satisfy $T_{intvl} \geq 2 \times T_{exp} + \alpha$ (where $\alpha$ represents a time margin), a dark signal is read out and then stored before starting repetitive photography, and the stored dark signal is subtracted from each of bright signals read out by repetitive reading.

5. A method according to claim 4, wherein, if the photographing interval and the exposure time of the image sensing element satisfy $T_{intvl} \geq 2 \times T_{exp} + \alpha$, a bright signal and a dark signal are read out during a repetitive photographing operation, and the dark signal is subtracted from the bright signal.

6. A method according to claim 5, wherein, if the photographing interval and the exposure time of the image sensing element satisfy $T_{intvl} \geq 3 \times T_{exp} + \alpha$, a bright signal is read out while dark signals are read out before and after reading of the bright signal during a repetitive photographing operation, and an average of the two dark signals, which are read out before and after acquisition of the bright signal, is subtracted from the bright signal.

7. An image sensing apparatus for interval photography, in which photography is repeatedly performed at predetermined time intervals, said image sensing apparatus comprising:
    image sensing means for performing photoelectric conversion;
    exposure means for selectively creating a light-shielded state and non-light-shielded state for the image sensing means;
    bright signal storage means for storing a bright signal output from the image sensing means in the non-light-shielded state;
    dark signal storage means for storing a dark signal output from the image sensing means in the light-shielded state;
    operation means for subtracting the dark signal from the bright signal to obtain a signal with suppressed dark noise; and
    control means for controlling a reading of the bright signal and dark signal from the image sensing means in accordance with a relationship between an exposure time of the image sensing means and a photographing time interval;
    wherein, if a photographing interval ($T_{intvl}$) and an exposure time ($T_{exp}$) of the image sensing means do not satisfy $T_{intvl} \geq 2 \times T_{exp} + \alpha$ (where $\alpha$ represents a time margin), the control means reads out a dark signal before starting repetitive photography, the readout dark signal is stored in the dark signal storage means, and the operation means subtracts the dark signal stored in the dark signal storage means from each of bright signals read out by repetitive reading.

8. An apparatus according to claim 7, wherein, if the photographing interval and the exposure time of the image sensing means satisfy $T_{intvl} \geq 2 \times T_{exp} + \alpha$, the control means reads out a bright signal and a dark signal during a repetitive photographing operation, the readout bright signal and dark signal are stored in the bright signal storage means and dark signal storage means, respectively, and the operation means subtracts the dark signal stored in the dark signal storage means from the bright signal stored in the bright signal storage means.

9. An apparatus according to claim 8, wherein, if the photographing interval and the exposure time of the image sensing means satisfy $T_{intvl} \geq 3 \times T_{exp} + \alpha$, the control means reads out a bright signal and also reads out dark signals before and after reading of the bright signal during a repetitive photographing operation, the readout bright signal and dark signals are stored in the bright signal storage means and dark signal storage means, respectively, and the operation unit subtracts an average of the two dark signals, which are read out before and after acquisition of the bright signal and then stored in the dark signal storage means, from the bright signal stored in the bright signal storage means.

10. A dark noise suppression processing method for interval photography, in which photography is repeatedly performed at predetermined time intervals, said method comprising:

controlling reading of a signal from image sensing means in accordance with a relationship between an exposure time of the image sensing means and a photographing time interval; and subtracting a dark signal output from the image sensing means in a light-shielded state from a bright signal output from the image sensing means in a non-light-shielded state to obtain a signal with suppressed dark noise, wherein, if a photographing interval ($T_{intvl}$) and an exposure time ($T_{exp}$) of the image sensing means do not satisfy $T_{intvl} \geq 2 \times T_{exp} + \alpha$ (where $\alpha$ represents a time margin), a dark signal is read out and then stored before starting repetitive photography, the stored dark signal is subtracted from each of bright signals read out by repetitive reading.

11. A method according to claim 10, wherein, if the photographing interval and the exposure time of the image sensing means satisfy $T_{intvl} \geq 2 \times T_{exp} + \alpha$, a bright signal and a dark signal are read out during a repetitive photographing operation, and the dark signal is subtracted from the bright signal.

12. A method according to claim 11, wherein, if the photographing interval and the exposure time of the image sensing means satisfy $T_{intvl} \geq 2 \times T_{exp} + \alpha$, a bright signal is read out while dark signals are read out before and after reading of the bright signal during a repetitive photographing operation, and an average of the two dark signals, which are read out before and after acquisition of the bright signal, is subtracted from the bright signal.

* * * * *